(12) United States Patent
Lu et al.

(10) Patent No.: US 12,498,427 B2
(45) Date of Patent: Dec. 16, 2025

(54) VOLTAGE SAMPLING APPARATUS AND METHOD

(71) Applicant: NuVolta Technologies (Hefei) Co., Ltd., Hefei (CN)

(72) Inventors: Li Lu, San Diego, CA (US); Olivier Gerard Metayer, Beaverton, OR (US); Paul Gunaratnam, Milford, MA (US)

(73) Assignee: NuVolta Technologies (Hefei) Co., Ltd., Hefei (CN)

( * ) Notice: Subject to any disclaimer, the term of this patent is extended or adjusted under 35 U.S.C. 154(b) by 576 days.

(21) Appl. No.: 18/055,864

(22) Filed: Nov. 16, 2022

(65) Prior Publication Data

US 2024/0159839 A1    May 16, 2024

(51) Int. Cl.
  *G01R 31/396*    (2019.01)
  *G01R 31/3835*   (2019.01)
  *H01M 10/42*     (2006.01)

(52) U.S. Cl.
  CPC ....... *G01R 31/396* (2019.01); *G01R 31/3835* (2019.01); *H01M 10/425* (2013.01); *H01M 2010/4271* (2013.01)

(58) Field of Classification Search
  None
  See application file for complete search history.

(56) References Cited

U.S. PATENT DOCUMENTS

| | | | |
|---|---|---|---|
| 7,663,375 B2* | 2/2010 | Yonezawa | G01R 19/16542 324/433 |
| 9,366,730 B2* | 6/2016 | Sano | G01R 31/396 |
| 9,465,083 B2* | 10/2016 | Makihara | H02J 7/0048 |
| 9,678,166 B2* | 6/2017 | Honda | G01R 31/396 |
| 10,447,160 B2* | 10/2019 | Chen | H02M 3/158 |
| 10,818,368 B2* | 10/2020 | Conte | G11C 5/145 |
| 2008/0150516 A1* | 6/2008 | Yonezawa | G01R 19/16542 324/123 R |
| 2016/0254815 A1* | 9/2016 | Oak | H03K 19/018528 327/333 |
| 2019/0081601 A1* | 3/2019 | Hurwitz | H03M 1/124 |
| 2020/0007085 A1* | 1/2020 | Hsieh | H03F 3/45183 |

* cited by examiner

*Primary Examiner* — Cassandra F Cox
(74) *Attorney, Agent, or Firm* — AP3 Law Firm PLLC

(57) ABSTRACT

An apparatus includes a first sampling switch coupled between a first voltage bus and a sampling capacitor, a first clock generator configured to produce a first gate drive signal fed into a gate of the first sampling switch, the first clock generator comprising a first capacitive coupled clock shifter, a first reset circuit and a second reset circuit, a second sampling switch coupled between a second voltage bus and the sampling capacitor, and a second clock generator configured to produce a second gate drive signal fed into a gate of the second sampling switch, the second clock generator comprising a second capacitive coupled clock shifter, a third reset circuit and a fourth reset circuit.

20 Claims, 12 Drawing Sheets

VOLTAGE SAMPLING APPARATUS AND METHOD

TECHNICAL FIELD

The present invention relates to an apparatus and method for measuring high-side voltages, and, in particular embodiments, to an apparatus for accurately measuring voltages of an upper battery of a plurality of batteries connected in series.

BACKGROUND

As technologies further advance, a variety of applications such as electric vehicles require power to be supplied by a plurality of batteries connected in series. In an electric vehicle, accurate monitoring of individual voltages of a plurality of batteries is very important. Accurate monitoring of the individual voltages can facilitate effective control over the charging and discharging of the plurality of batteries.

In some applications (e.g., multi-cell fuel gauge applications), the voltage (e.g., 5-10 V for a two-cell battery system or 35-40 V for an eight-cell battery system) of the battery to be measured is much higher than the power supply voltage (e.g., 3 V) of the voltage measurement circuit. In order to protect the voltage measurement circuit from being damaged by the high voltage of the battery system, a voltage divider is employed to ensure that the voltage fed into the voltage measurement circuit is less than the power supply voltage. For example, in an eight-cell battery system, the voltages across two terminals of the uppermost battery is in a range from 35 V to 40 V. The supply voltage of the voltage measurement circuit is about 3 V. A voltage divider having a voltage division ratio of 20:1 is employed to convert the voltage to be measured from a high voltage range (e.g., 35 V to 40 V) to a low voltage range (e.g., 1.75 V to 2 V).

The voltage divider causes extra power consumption. In addition, the voltage divider may occupy a large silicon area. Furthermore, the voltage divider reduces the signal-to-noise ratio. More importantly, it introduces unnecessary gain errors and/or offsets due to the resistor mismatch of the voltage divider.

Another known way to measure a high voltage signal is based on a voltage-to-current converter. The voltage-to-current converter is configured to convert the high side voltage into a current flowing through a small resistor. The voltage across the small resistor creates a voltage within the range of the power supply of the voltage measurement circuit.

The drawback with this solution is that the voltage-to-current converter requires a high power supply (e.g., 40 V) to deal with the high voltage input signal. The high power supply may be implemented as a charge pump circuit. However, this solution may cause the same issues as described above with respect to the voltage divider.

The existing high voltage measurement methods described above have many drawbacks. It would be desirable to have a simple and accurate way to sample the high-side voltage in a battery power system. The present disclosure addresses this need.

SUMMARY

These and other problems are generally solved or circumvented, and technical advantages are generally achieved, by preferred embodiments of the present disclosure which provide an apparatus for accurately measuring voltages of an upper battery in a battery power system having a plurality of batteries connected in series.

In accordance with an embodiment, an apparatus comprises a first sampling switch coupled between a first voltage bus and a sampling capacitor, a first clock generator configured to produce a first gate drive signal fed into a gate of the first sampling switch, the first clock generator comprising a first capacitive coupled clock shifter, a first reset circuit and a second reset circuit, a second sampling switch coupled between a second voltage bus and the sampling capacitor, and a second clock generator configured to produce a second gate drive signal fed into a gate of the second sampling switch, the second clock generator comprising a second capacitive coupled clock shifter, a third reset circuit and a fourth reset circuit.

In accordance with another embodiment, a method comprises level-shifting, by a first capacitive coupled clock shifter, a first clock signal to a first voltage range having an upper limit equal to a voltage on a first voltage bus, resetting, by a first reset circuit and a second reset circuit, the first capacitive coupled clock shifter so that an output voltage of the first capacitive coupled clock shifter is equal to a voltage on the first voltage bus once the first clock signal stops, level-shifting, by a second capacitive coupled clock shifter, a second clock signal to a second voltage range having a lower limit equal to a voltage on a second voltage bus, and resetting, by a third reset circuit and a fourth reset circuit, the second capacitive coupled clock shifter so that an output voltage of the second capacitive coupled clock shifter is equal to a voltage on the second voltage bus once the second clock signal stops.

In accordance with yet another embodiment, a system comprises a plurality of batteries connected in series, a sampling circuit having two inputs coupled to a positive terminal and a negative terminal of a battery of the plurality of batteries, wherein the sampling circuit comprises a first sampling switch coupled between a first voltage bus and a sampling capacitor, a first clock generator configured to produce a first gate drive signal fed into a gate of the first sampling switch, the first clock generator comprising a first capacitive coupled clock shifter configured to level-shift a first clock signal to obtain the first gate drive signal, a first reset circuit and a second reset circuit, a second sampling switch coupled between a second voltage bus and the sampling capacitor, and a second clock generator configured to produce a second gate drive signal fed into a gate of the second sampling switch, the second clock generator comprising a second capacitive coupled clock shifter configured to level-shift a second clock signal to obtain the first gate drive signal, a third reset circuit and a fourth reset circuit, a common mode reference coupled to an output of the sampling circuit through a first control switch, and a charge process circuit coupled to the output of the sampling circuit through a second control switch.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely an apparatus for accurately measuring voltages of an upper battery in a battery power system having a plurality of batteries connected in series. The disclosure may also be applied, however, to measuring various parameters in an electronic system. Hereinafter, various embodiments will be explained in detail with reference to the accompanying drawings.

Figure 1:
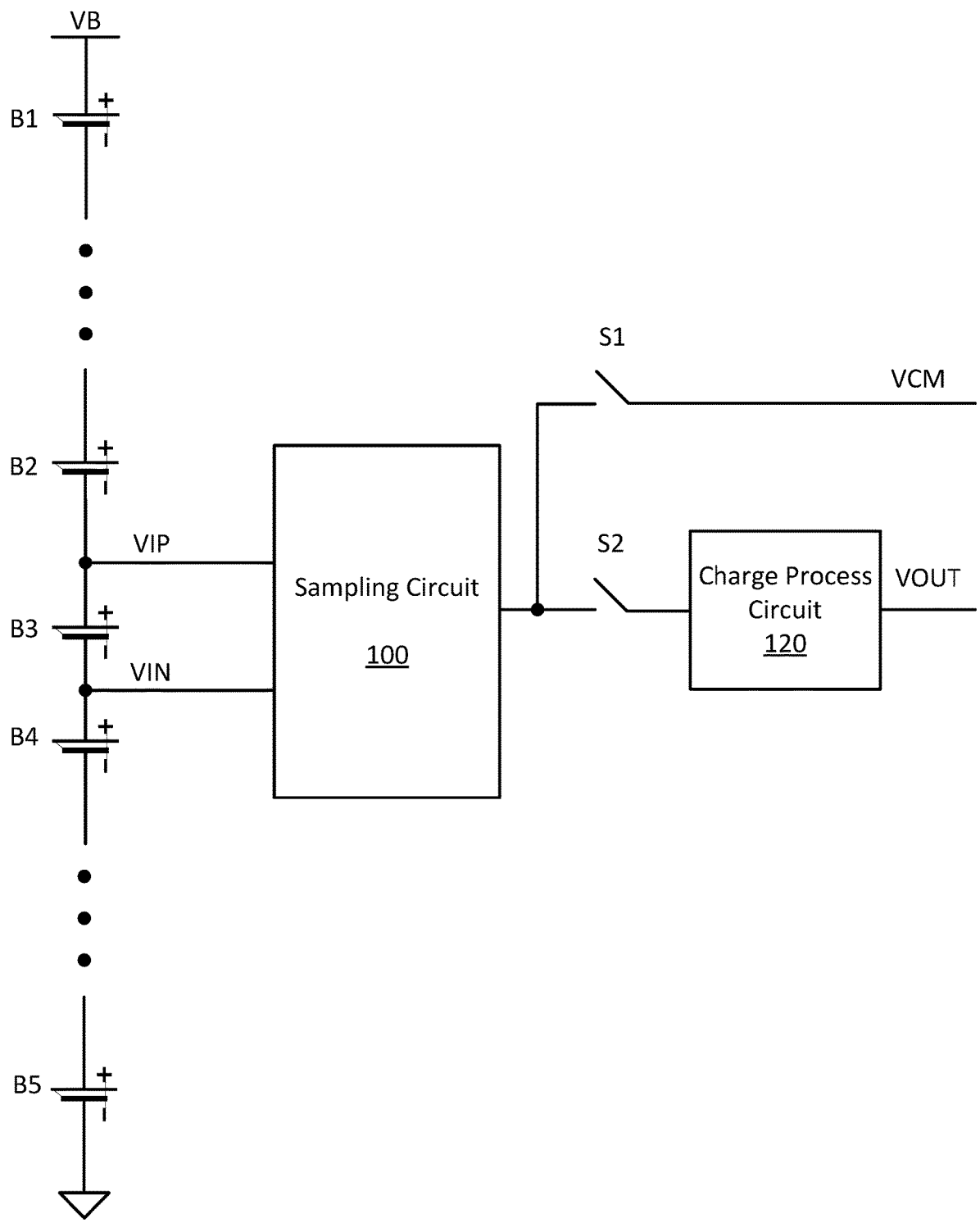
FIG. 1 illustrates a block diagram of a high-side voltage sampling system in accordance with various embodiments of the present disclosure.

FIG. 1 illustrates a block diagram of a high-side voltage sampling system in accordance with various embodiments of the present disclosure. A plurality of batteries are connected in series between a voltage bus VB and ground. For simplicity, only a first battery B1, a second battery B2, a third battery B3, a fourth battery B4 and a fifth battery B5 of the plurality of batteries are shown in FIG. 1.

As shown in FIG. 1, a sampling circuit 100 has two inputs coupled to a positive terminal and a negative terminal of the third battery B3 of the plurality of batteries, respectively. The sampling circuit 100 is employed to measure the voltages (VIP and VIN) of the third battery B3.

In some embodiment, the sampling circuit 100 comprises a first sampling switch and a second sampling switch. The first sampling switch is coupled between the positive terminal of B3 and a sampling capacitor. The second sampling switch is coupled between the negative terminal of B3 and the sampling capacitor. In order to control the turn-on and turn-off of the first sampling switch and the second sampling switch, the sampling circuit 100 further comprises a first clock generator and a second clock generator. The first clock generator is configured to produce a first gate drive signal fed into a gate of the first sampling switch. The second clock generator is configured to produce a second gate drive signal fed into a gate of the second sampling switch.

In some embodiments, the first clock generator comprises a first capacitive coupled clock shifter configured to level-shift a first clock signal to obtain the first gate drive signal, a first reset circuit and a second reset circuit. The detailed structure and operating principle of the first clock generator will be described below with respect to FIG. 3.

In some embodiments, the second clock generator comprising a second capacitive coupled clock shifter configured to level-shift a second clock signal to obtain the second gate drive signal, a third reset circuit and a fourth reset circuit. The detailed structure and operating principle of the second clock generator will be described below with respect to FIG. 4.

As shown in FIG. 1, the high-side voltage sampling system further comprises a common mode reference VCM and a charge process circuit 120. The common mode reference VCM is coupled to an output of the sampling circuit 100 through a first control switch S1. The detailed connection between the common mode reference VCM and the sampling circuit 100 will be described below with respect to FIG. 2. The charge process circuit 120 is coupled to the output of the sampling circuit 100 through a second control switch S2. The detailed structure of the charge process circuit 120 will be described below with respect to FIG. 2.

Figure 2:
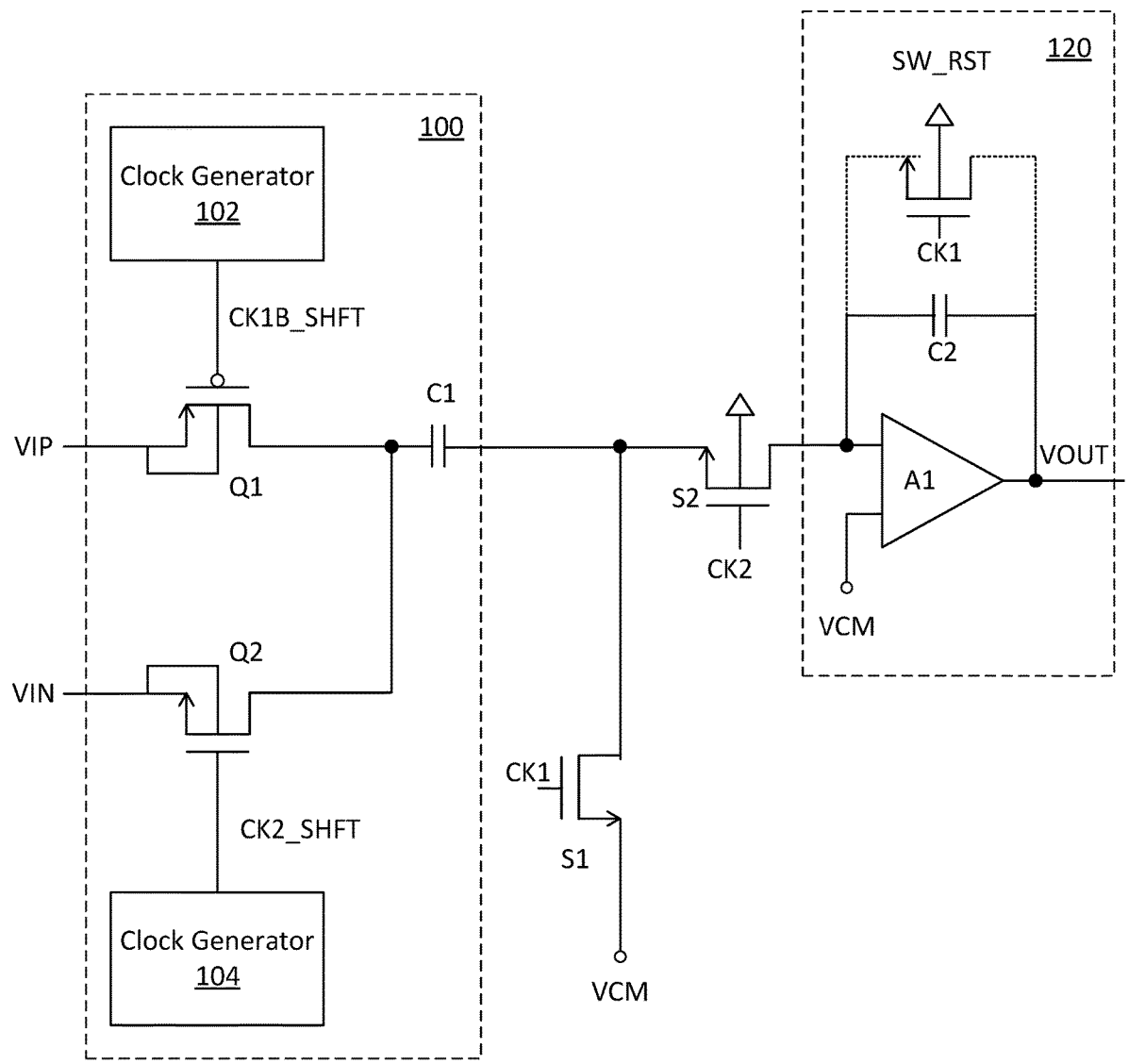
FIG. 2 illustrates a schematic diagram of the high-side voltage sampling system shown in FIG. 1 in accordance with various embodiments of the present disclosure.

FIG. 2 illustrates a schematic diagram of the high-side voltage sampling system shown in FIG. 1 in accordance with various embodiments of the present disclosure. The sampling circuit 100 comprises a first sampling switch Q1, a second sampling switch Q2, a sampling capacitor C1, a first clock generator 102 and a second clock generator 104. As shown in FIG. 2, the first sampling switch Q1 is implemented as a p-type transistor having a source terminal coupled to a first voltage bus VIP, a body terminal connected to the source terminal and a drain terminal coupled to the sampling capacitor C1. The second sampling switch Q2 is implemented as is an n-type transistor having a source terminal coupled to a second voltage bus VIN, a body terminal connected to the source terminal and a drain terminal coupled to the sampling capacitor C1. Referring back to FIG. 1, the first voltage bus VIP is coupled to a positive terminal of the battery B3. The second voltage bus VIN is coupled to a negative terminal of the battery B3.

As shown in FIG. 2, the first sampling switch Q1 is coupled between the first voltage bus VIP and the sampling capacitor C1. The first clock generator 102 is configured to produce a first gate drive signal CK1B_SHFT fed into a gate of the first sampling switch Q1. In some embodiments, the first clock generator 102 comprises a first capacitive coupled clock shifter, a first reset circuit and a second reset circuit. The first capacitive coupled clock shifter is configured to convert a first clock signal CK1 into the first gate drive signal CK1B_SHFT.

The second sampling switch Q2 is coupled between the second voltage bus VIN and the sampling capacitor C1. The second clock generator 104 is configured to produce a second gate drive signal CK2_SHFT fed into a gate of the second sampling switch Q2. The second clock generator 104 comprises a second capacitive coupled clock shifter, a third reset circuit and a fourth reset circuit. The second capacitive coupled clock shifter is configured to convert a second clock signal CK2 into the second gate drive signal CK2_SHFT.

As shown in FIG. 2, the first sampling switch Q1 is a p-type switch (e.g., PMOS) coupled to the higher voltage terminal of B3. The second sampling switch Q2 is an n-type switch (e.g., NMOS) coupled to the lower voltage terminal of B3. The source and body of Q1 are tied to the first voltage bus VIP. The gate of Q1 is shifted around VIP. The drain of Q1 is charged to VIP once Q1 is turned on. Q1 is floating around VIP so that Q1 can pass and isolate VIP. Likewise, the source and body of Q2 are tied to the second voltage bus VIN. The gate of Q2 is shifted around VIN. The drain of Q2 is charged to VIN once Q2 is turned on. Q2 is floating around VIN so that Q2 can pass and isolate VIN. The maximum stress voltages on the switches Q1 and Q2 (e.g., VGS, VGD, VGB, VDS, VDB and VSB) are within the input differential voltage (i.e. VIP–VIN). In many applications, the input differential voltage is in a limited range (e.g., 0 V-5 V). As a result, Q1 and Q2 are able to operate reliably.

The common mode reference VCM is connected to the sampling capacitor C1 through the first control switch S1. The charge process circuit 120 is connected to the sampling capacitor C1 through the second control switch S2. The first clock signal CK1 is fed into a gate of the first control switch S1. The second clock signal CK2 is fed into a gate of the second control switch S2.

The charge process circuit 120 comprises an amplifier A1, a capacitor C2 and a switch SW_RST. The capacitor C2 is connected between a first input and an output of the amplifier A1. The switch SW_RST is coupled between the first input and the output of the amplifier A1. A second input of the amplifier A1 is configured to receive the common mode reference VCM.

It should be noted that, as indicated by the dashed lines connected to the switch SW_RST, SW_RST is an optional element. Depending on different applications and design needs, the charge process circuit 120 can be configured as an amplifier or an integrator. It should be noted that the example circuit shown in FIG. 2 can be configured in a fully differential fashion as needed.

In some embodiments, clock signals CK1 and CK2 are two complementary signals. The clock signals are in the CK1 phase when CK1 is of a logic high state, and CK2 is of a logic low state. On the other hand, the clock signals are in the CK2 phase when CK2 is of a logic high state, and CK1 is of a logic low state.

In the CK1 phase, the voltage on the first voltage bus VIP is sampled on C1. In the CK2 phase, the charge on C1 is transferred to C2. The amount of charge transferred from C1 to C2 can be expressed by the following equation:

$$Q = (VIP - VIN) \times C1 \quad (1)$$

The change in the output voltage of the amplifier A1 can be expressed by the following equation:

$$VOUT = (VIP - VIN) \times \frac{C1}{C2} \quad (2)$$

In Equation (2), VIP is the voltage on the first voltage bus. VIN is the voltage on the second voltage bus. C1 is the capacitance of the sampling capacitor C1. C2 is the capacitance of the capacitor C2.

One advantageous feature of having the high-side voltage sampling system shown in FIG. 2 is the high-side voltage sampling system does not cause extra power consumption. Furthermore, the high-side voltage sampling system does not introduce various errors such as offset errors, non-linearity errors, gain errors and the like.

Figure 3:
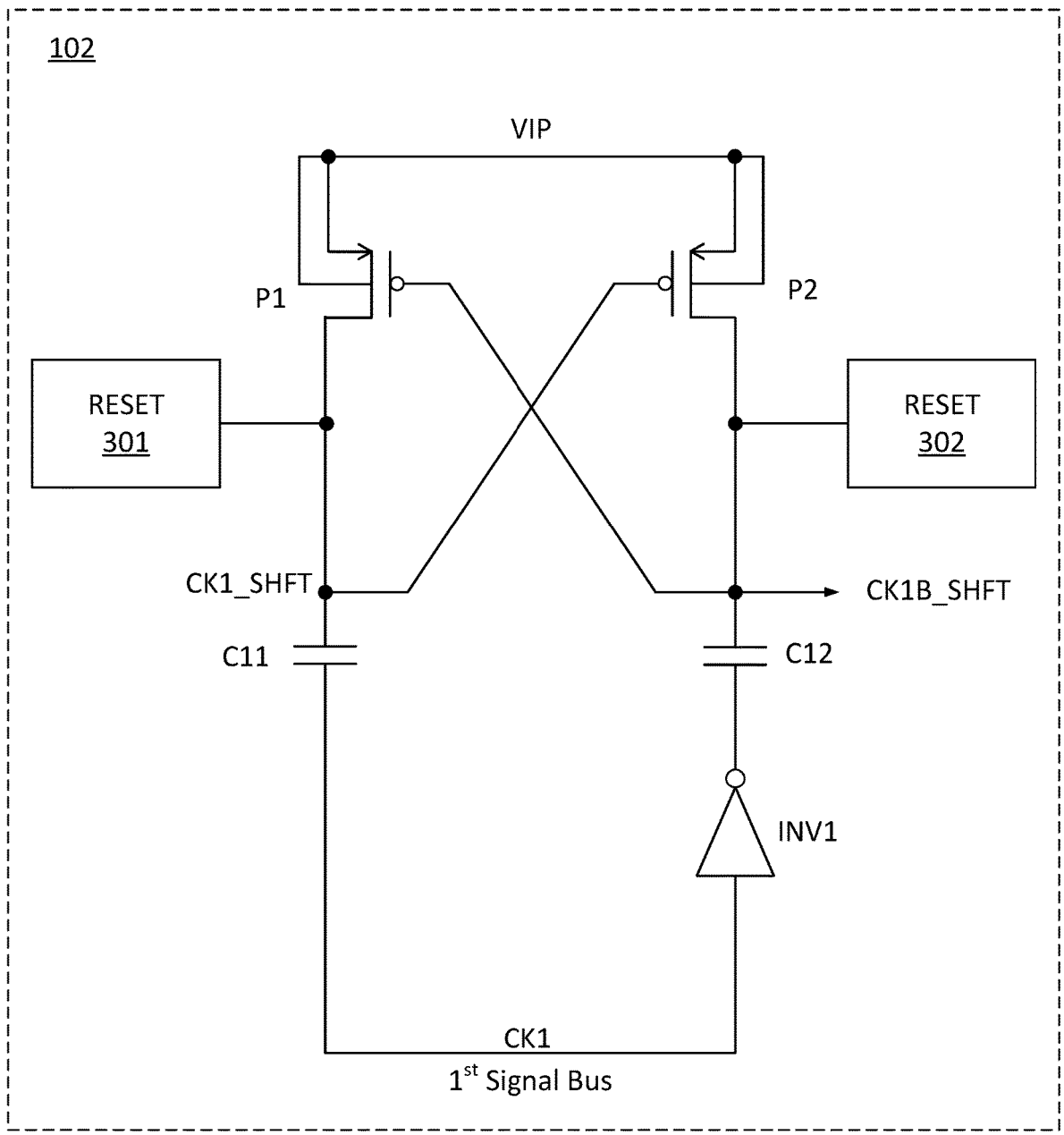
FIG. 3 illustrates a schematic diagram of the first capacitive coupled clock shifter in accordance with various embodiments of the present disclosure.

FIG. 3 illustrates a schematic diagram of the first capacitive coupled clock shifter in accordance with various embodiments of the present disclosure. The first clock generator 102 comprise the first capacitive coupled clock shifter, a first reset circuit 301 and a second reset circuit 302. The first capacitive coupled clock shifter comprises a first p-type transistor P1, a first capacitor C11, a second p-type transistor P2, a second capacitor C12 and a first inverter INV1.

As shown in FIG. 3, the first p-type transistor P1 and the first capacitor C11 are connected in series between the first voltage bus VIP and a first signal bus. As shown in FIG. 3, the first clock signal CK1 flows on the first signal bus. The second p-type transistor P2, the second capacitor C12 and the first inverter INV1 are connected in series between the first voltage bus VIP and the first signal bus. The common node of the first p-type transistor P1 and the first capacitor C11 is connected to a gate of the second p-type transistor P2. The common node of the second p-type transistor P2 and the second capacitor C12 is connected to a gate of the first p-type transistor P1. As shown in FIG. 3, the output signal CK1B_SHFT of the first clock generator 102 is generated at the common node of the second p-type transistor P2 and the second capacitor C12.

The first reset circuit 301 is connected to the common node of the first p-type transistor P1 and the first capacitor C11. The second reset circuit 302 is connected to the common node of the second p-type transistor P2 and the second capacitor C12.

In operation, the first capacitive coupled clock shifter is configured to shift the first clock signal CK1 up to a voltage close to VIP. In particular, this voltage (CK1B_SHFT) is in a range from VIP-VDD to VIP. VDD is a predetermined voltage (e.g., 3 V) higher than the turn-on VGS threshold voltage of Q1. The first reset circuit 301 and the second reset circuit 302 are configured such that the voltages of CK1B_SHFT and CK1_SHFT are charged up to a voltage level equal to VIP once the first clock signal CK1 stops switching. Such a control mechanism prevents the voltages of CK1B_SHFT and CK1_SHFT from being locked at a random point such as a middle point of VIP.

Figure 4:
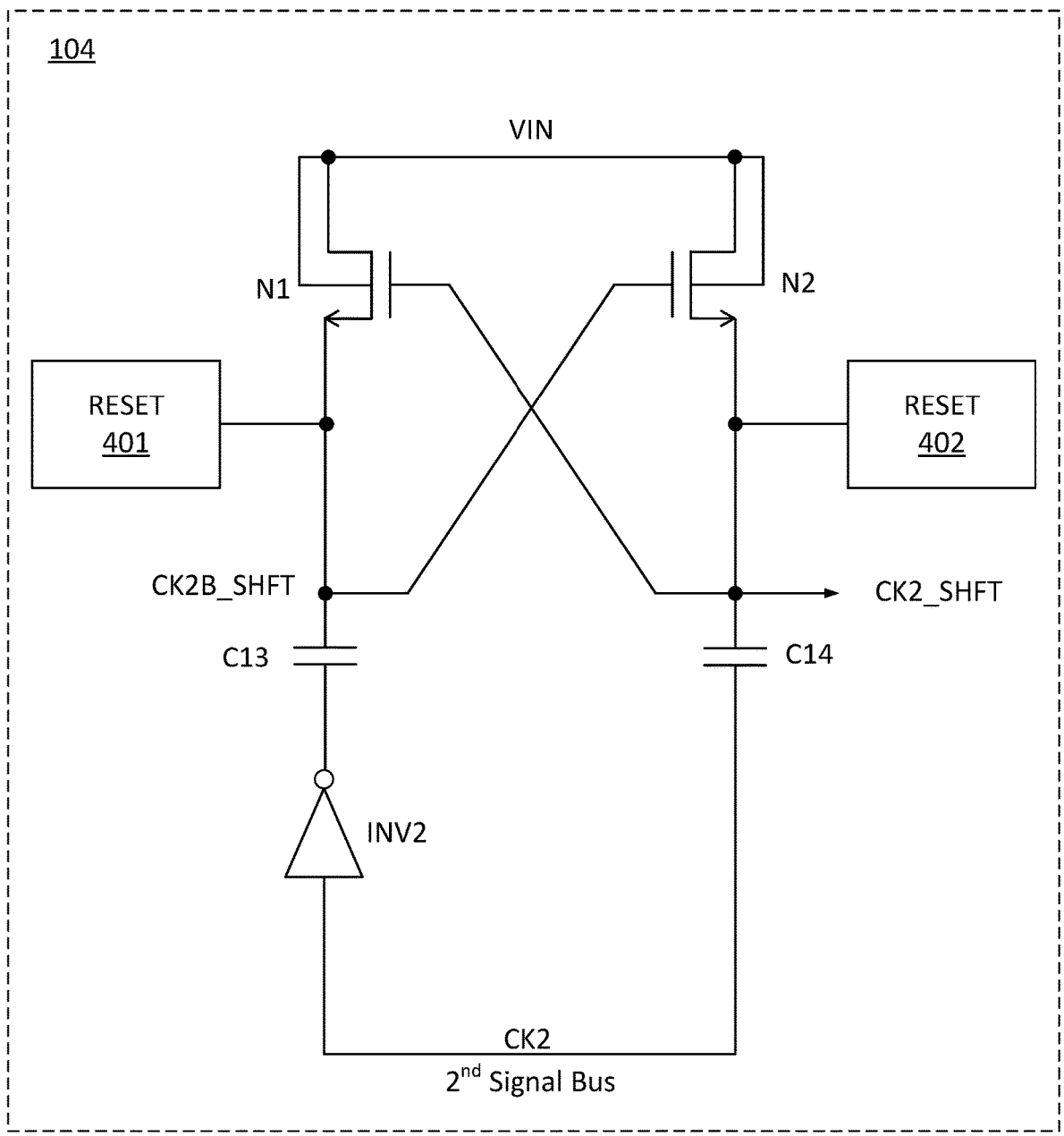
FIG. 4 illustrates a schematic diagram of the second capacitive coupled clock shifter in accordance with various embodiments of the present disclosure.

FIG. 4 illustrates a schematic diagram of the second capacitive coupled clock shifter in accordance with various embodiments of the present disclosure. The second clock generator 104 comprise the second capacitive coupled clock shifter, a third reset circuit 401 and a fourth reset circuit 402. The second capacitive coupled clock shifter comprises a first n-type transistor N1, a third capacitor C13, a second n-type transistor N2, a fourth capacitor C14 and a second inverter INV2.

As shown in FIG. 4, the first n-type transistor N1, the third capacitor C13 and the second inverter INV2 are connected in series between the second voltage bus VIN and a second signal bus. As shown in FIG. 4, the second clock signal CK2 flows on the second signal bus. The second n-type transistor N2 and the fourth capacitor C14 are connected in series between the second voltage bus VIN and the second signal bus. The common node of the first n-type transistor N1 and the third capacitor C13 is connected to a gate of the second n-type transistor N2. The common node of the second n-type transistor N2 and the fourth capacitor C14 is connected to a gate of the first n-type transistor N1. As shown in FIG. 4, the output signal CK2_SHFT of the second clock generator 104 is generated at the common node of the second n-type transistor N2 and the fourth capacitor C14.

The third reset circuit 401 is connected to the common node of the first n-type transistor N1 and the third capacitor C13. The fourth reset circuit 402 is connected to the common node of the second n-type transistor N2 and the fourth capacitor C14.

In operation, the second capacitive coupled clock shifter is configured to shift the second clock signal CK2 up to a voltage close to VIN. In particular, this voltage (CK2_SHFT) is in a range from VIN to (VIN+VDD). VDD is a predetermined voltage (e.g., 3 V) higher than the turn-on VGS threshold voltage of Q2. The third reset circuit 401 and the fourth reset circuit 402 are configured such that the voltages of CK2B_SHFT and CK2_SHFT are charged down to a voltage level equal to VIN once the second clock signal CK2 stops switching. Such a control mechanism prevents the voltages of CK2B_SHFT and CK2_SHFT from being locked at a random point such as a middle point of VIN.

Figure 5:
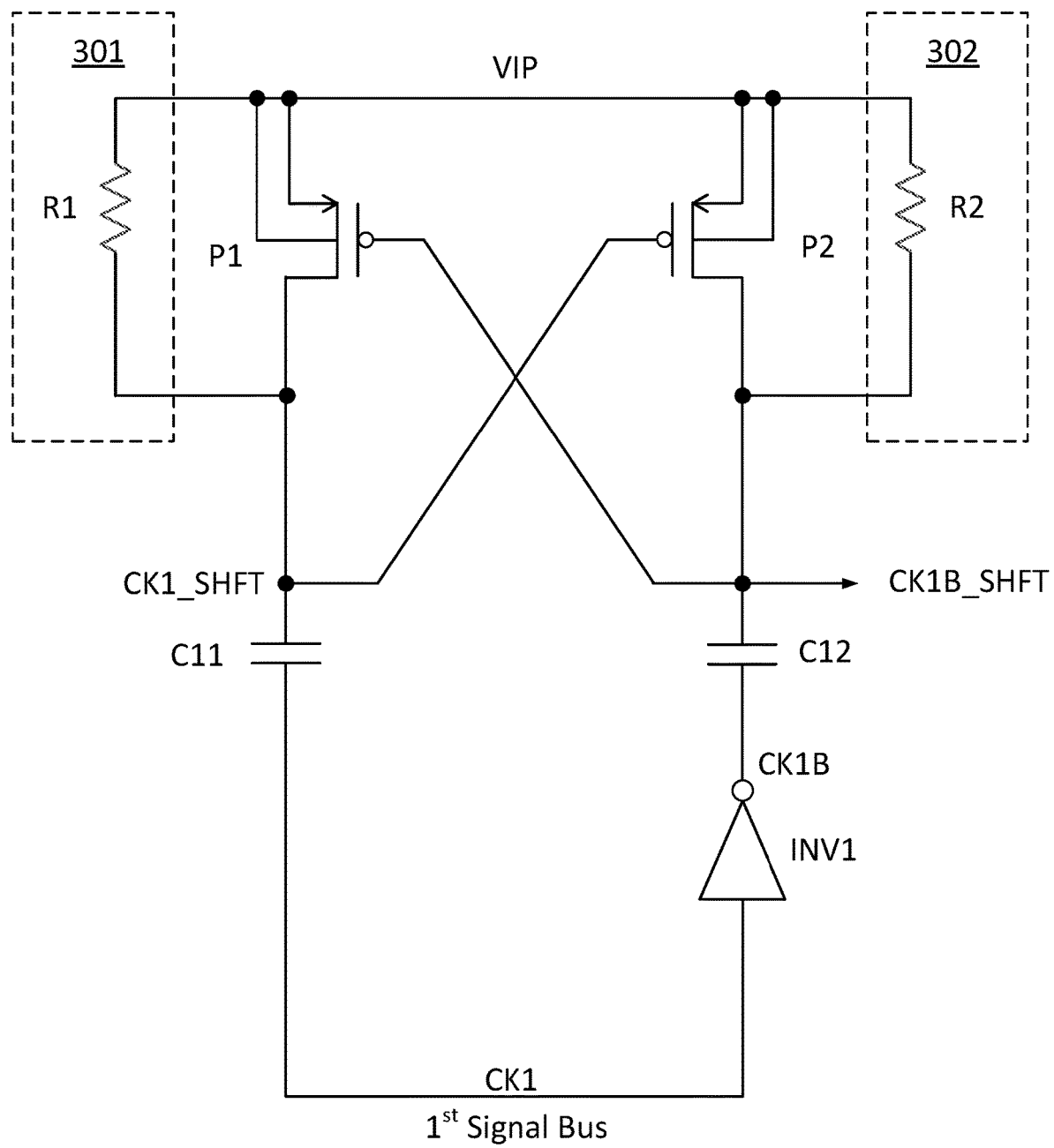
FIG. 5 illustrates a first implementation of the reset circuits of the first capacitive coupled clock shifter in accordance with various embodiments of the present disclosure.

FIG. 5 illustrates a first implementation of the reset circuits of the first capacitive coupled clock shifter in accordance with various embodiments of the present disclosure. The schematic diagram shown in FIG. 5 is similar to that shown in FIG. 3 except that the first reset circuit 301 and the second reset circuit 302 are replaced by a first resistor R1 and a second resistor R2, respectively.

As shown in FIG. 5, the first resistor R1 is connected between the first voltage bus VIP, and the common node of the first p-type transistor P1 and the first capacitor C11. The second resistor R2 is connected between the first voltage bus VIP, and the common node of the second p-type transistor P2 and the second capacitor C12.

In operation, the first resistor R1 and the second resistor R2 are configured to reset an output (e.g., CK1B_SHFT) of the first capacitive coupled clock shifter so that an output voltage of the first capacitive coupled clock shifter is equal to a voltage on the first voltage bus VIP after the first clock signal CK1 stops switching. In addition, the first resistor R1 and the second resistor R2 guarantee that after the first clock signal CK1 stops switching, the output (CK1B_SHFT) stays at an off state so that the first sampling switch Q1 is turned off.

Figure 6:
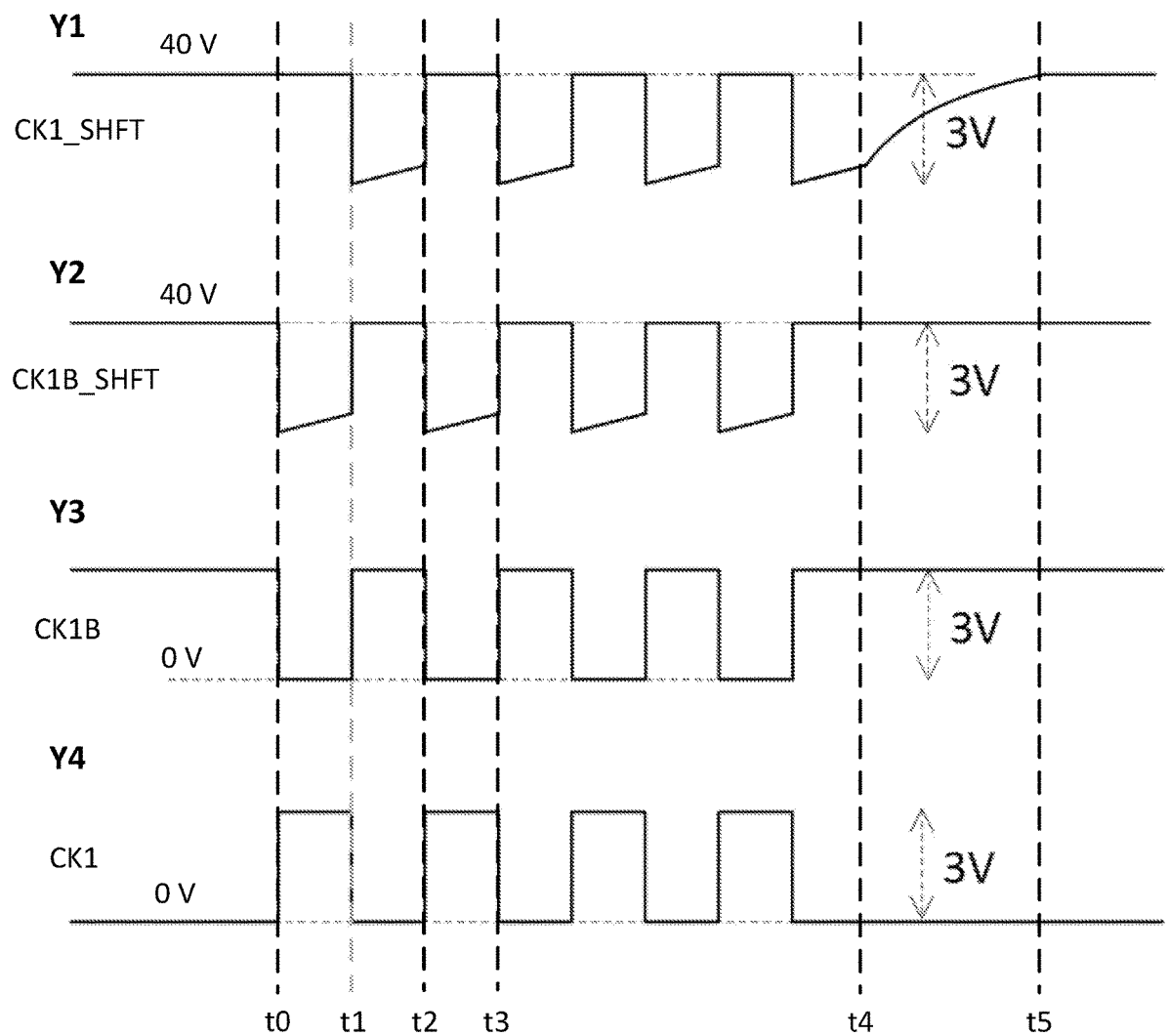
FIG. 6 illustrates various signals associated with the first capacitive coupled clock shifter shown in FIG. 5 in accordance with various embodiments of the present disclosure.

FIG. 6 illustrates various signals associated with the first capacitive coupled clock shifter shown in FIG. 5 in accordance with various embodiments of the present disclosure. The horizontal axis of FIG. 6 represents intervals of time. There may be four rows in FIG. 6. The first row represents the signal (CK1_SHFT) at the common node of P1 and C11. The second row represents the signal (CK1B_SHFT) at the common node of P2 and C12. The third row represents the output signal (CK1B) of the first inverter INV1. The fourth row represents the first clock signal (CK1).

Prior to t0, CK1_SHFT and CK1B_SHFT are reset to a voltage level equal to VIP (e.g., 40 V). At t1, CK1 changes from a logic high state to a logic low state. In response to this change, CK1B changes from a logic low state to a logic high state. The voltages across the capacitors C11 and C12 do not change instantaneously. Therefore, at t1, CK1B_SHFT jumps from a low voltage to a high voltage. The voltage jump is about 3 V as shown in FIG. 6. CK1_SHFT drops from a high voltage to a low voltage. The voltage drop of CK1_SHFT is about 3 V as shown in FIG. 6. From t1 to t2, CK1_SHFT rises slightly due to the fact that C11 is charged by VIP through R1.

At t2, CK1 changes from a logic low state to a logic high state. In response to this change, CK1B changes from a logic high state to a logic low state. The voltages across the capacitors C11 and C12 are not able to change instantaneously. Therefore, at t2, CK1B_SHFT drops from a high voltage to a low voltage. The voltage drop is about 3 V as shown in FIG. 6. CK1_SHFT jumps from a low voltage to a high voltage. The voltage jump of CK1_SHFT is about 3 V as shown in FIG. 6. From t2 to t3, CK1B_SHFT rises slightly due to the fact that C12 is charged by VIP through R2.

At t3, the signal transitions are similar to those at t1, and hence are not described in detail herein. At t4, CK1 stops switching and stays at a logic low state. CK1B stays a logic high state. From t4 to t5, CK1_SHFT is charged up to VIP by the first resistor R1.

Figure 7:
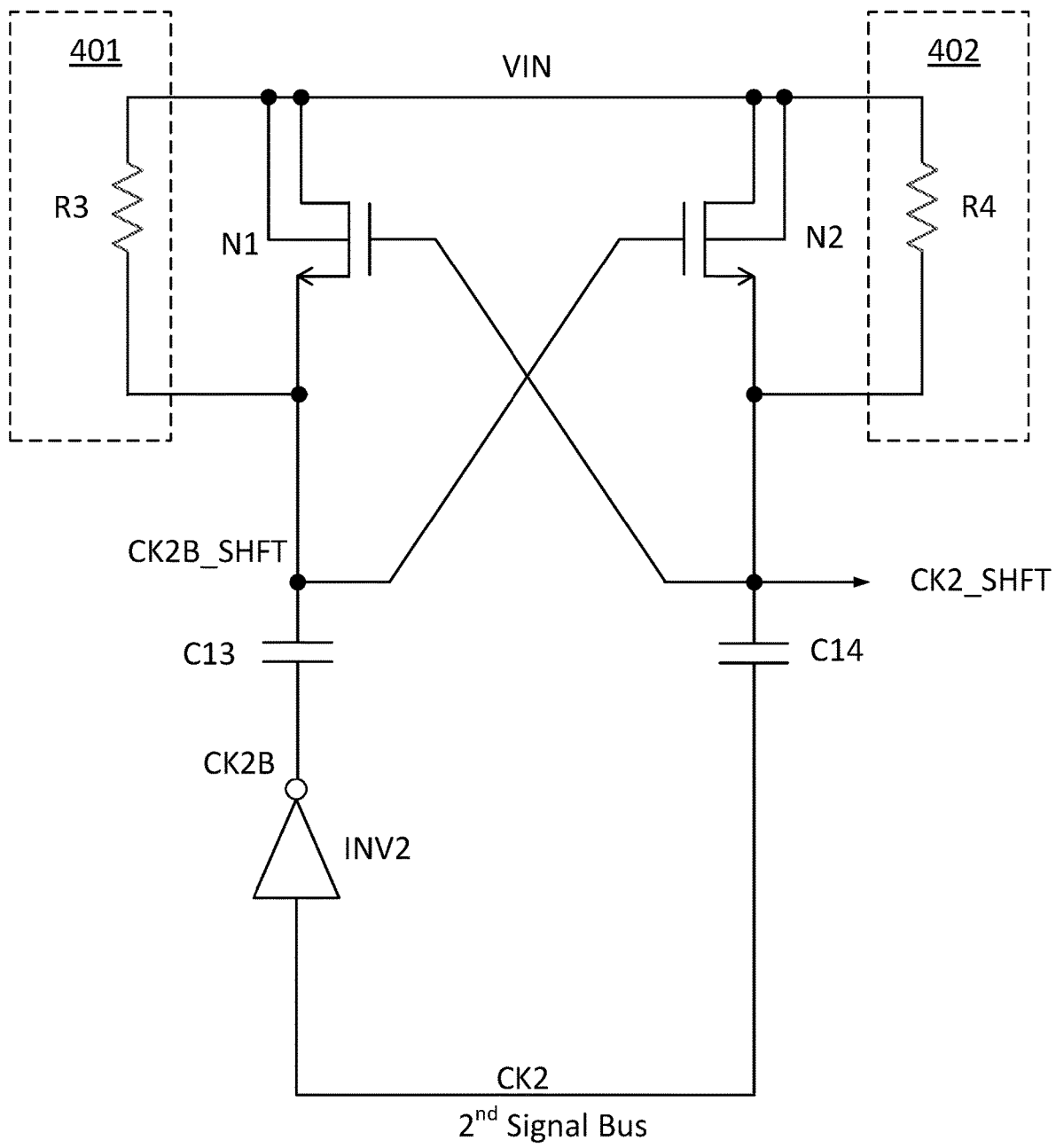
FIG. 7 illustrates a first implementation of the reset circuits of the second capacitive coupled clock shifter in accordance with various embodiments of the present disclosure.

FIG. 7 illustrates a first implementation of the reset circuits of the second capacitive coupled clock shifter in accordance with various embodiments of the present disclosure. The schematic diagram shown in FIG. 7 is similar to that shown in FIG. 4 except that the third reset circuit 401 and the fourth reset circuit 402 are replaced by a third resistor R3 and a fourth resistor R4, respectively.

As shown in FIG. 7, the third resistor R3 is connected between the second voltage bus VIN, and the common node of the first n-type transistor N1 and the third capacitor C13. The fourth resistor R4 is connected between the second voltage bus VIN, and the common node of the second n-type transistor N2 and the fourth capacitor C14.

In operation, the third resistor R3 and the fourth resistor R4 are configured to reset an output (e.g., CK2_SHFT) of the second capacitive coupled clock shifter so that an output voltage of the second capacitive coupled clock shifter is equal to a voltage on the second voltage bus VIN after the second clock signal CK2 stops switching. In addition, the third resistor R3 and the fourth resistor R4 guarantee that when the second clock signal CK2 stops switching, the output (CK2_SHFT) stays at an off state so that the second sampling switch Q2 is turned off.

Figure 8:
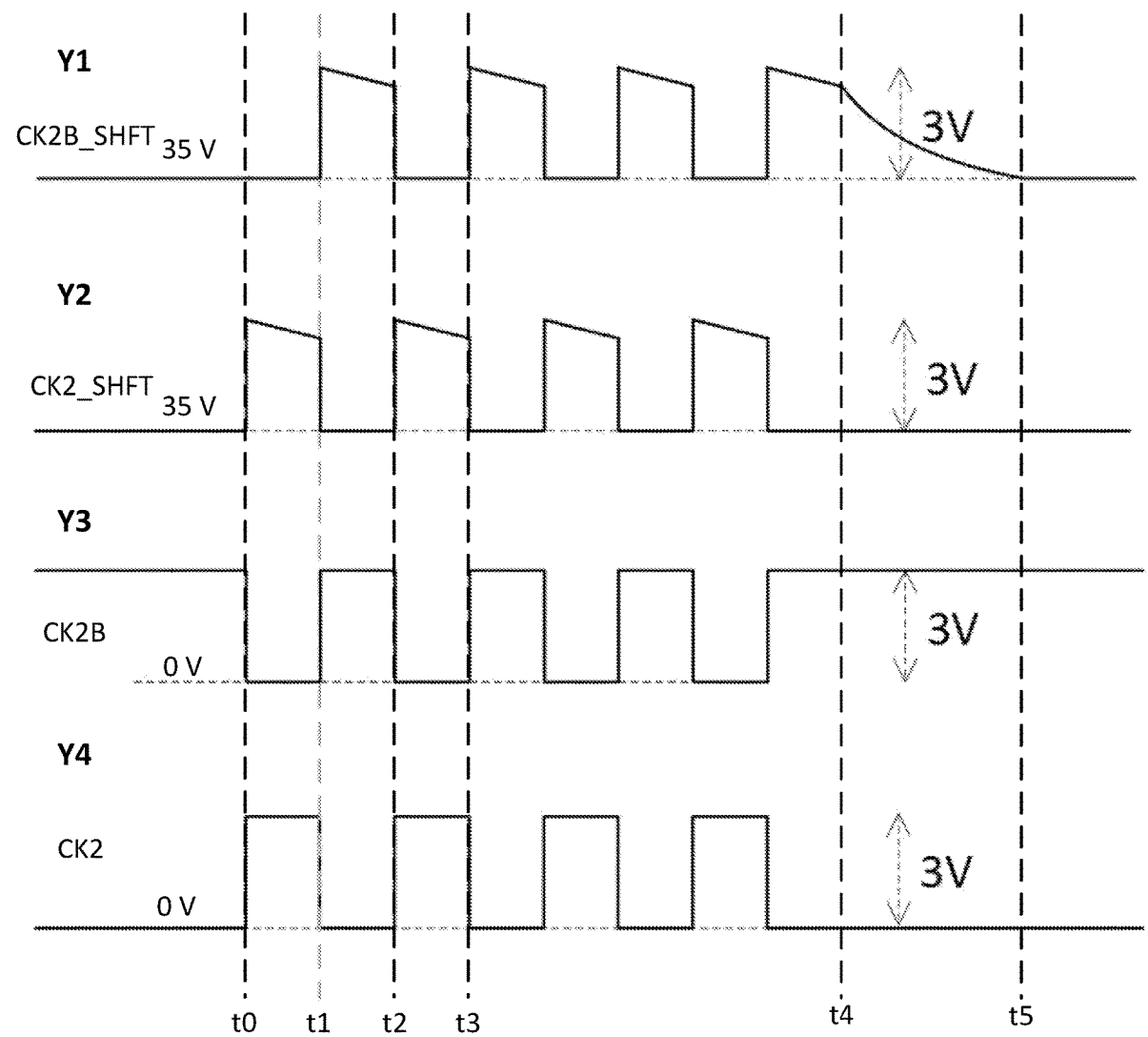
FIG. 8 illustrates various signals associated with the second capacitive coupled clock shifter shown in FIG. 7 in accordance with various embodiments of the present disclosure.

FIG. 8 illustrates various signals associated with the second capacitive coupled clock shifter shown in FIG. 7 in accordance with various embodiments of the present disclosure. The horizontal axis of FIG. 8 represents intervals of time. There may be four rows in FIG. 8. The first row represents the signal (CK2B_SHFT) at the common node of N1 and C13. The second row represents the signal (CK2_SHFT) at the common node of N2 and C14. The third row represents the output signal (CK2B) of the second inverter INV2. The fourth row represents the second clock signal (CK2).

Prior to t0, CK2_SHFT and CK2B_SHFT are reset to a voltage level equal to VIN (e.g., 35 V). At t1, CK2 changes from a logic high state to a logic low state. In response to this change, CK2B changes from a logic low state to a logic high state. The voltages across the capacitors C13 and C14 are not able to change instantaneously. Therefore, at t1, CK2B_SHFT jumps from a low voltage to a high voltage. The voltage jump is about 3 V as shown in FIG. 8. CK2_SHFT drops from a high voltage to a low voltage. The voltage drop of CK2_SHFT is about 3 V as shown in FIG. 8. From t1 to t2, CK2B_SHFT drops slightly due to the fact that C13 is discharged by VIN through R3.

At t2, CK2 changes from a logic low state to a logic high state. In response to this change, CK2B changes from a logic high state to a logic low state. The voltages across the capacitors C13 and C14 are not able to change instantaneously. Therefore, at t2, CK2B_SHFT drops from a high voltage to a low voltage. The voltage drop is about 3 V as shown in FIG. 8. CK2_SHFT jumps from a low voltage to a high voltage. The voltage jump of CK2_SHFT is about 3 V as shown in FIG. 8. From t2 to t3, CK2_SHFT drops slightly due to the fact that C14 is discharged by VIN through R4.

At t3, the signal transitions are similar to those at t1, and hence are not described in detail herein. At t4, CK2 stops switching and stays at a logic low state. CK2B stays a logic high state. From t4 to t5, CK2B_SHFT is discharged down to VIN by the first resistor R3.

Figure 9:
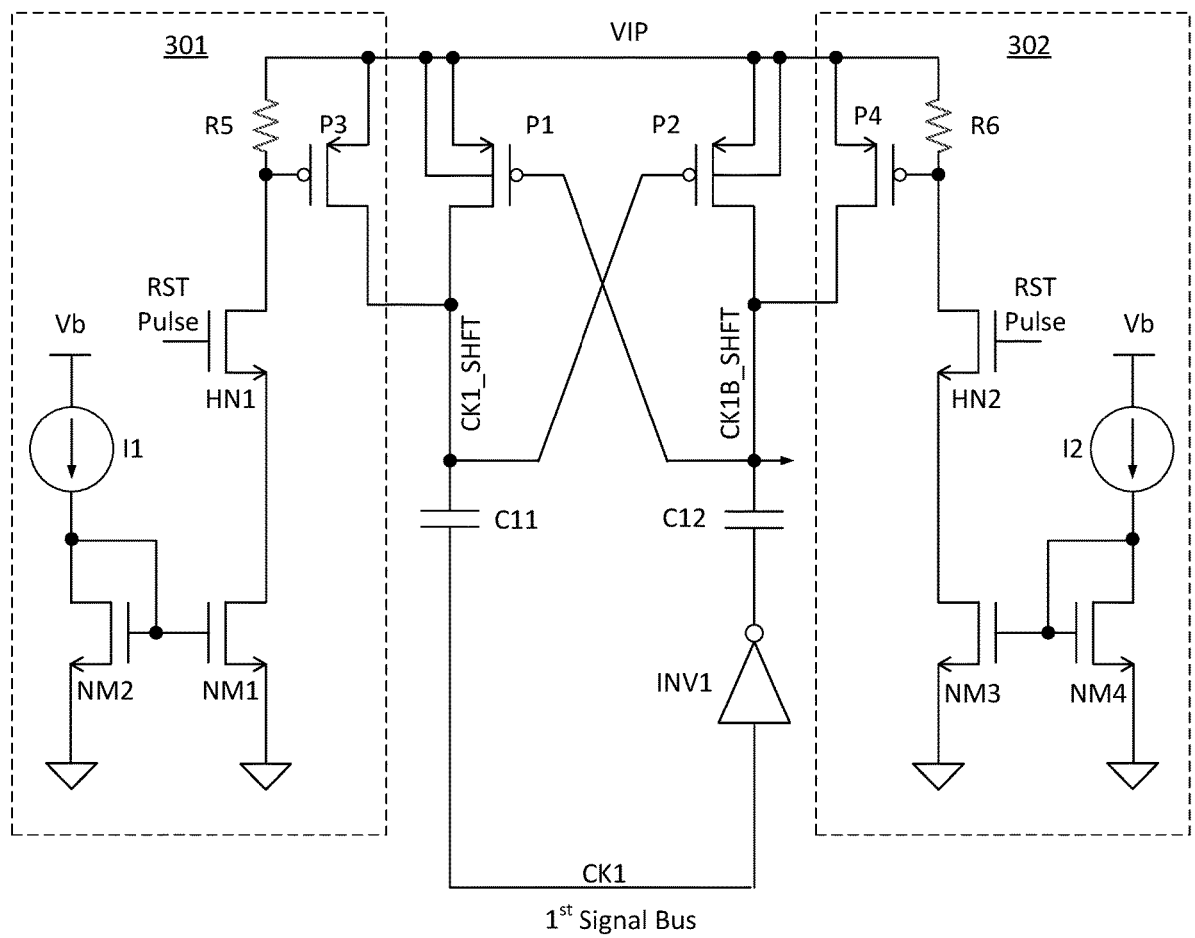
FIG. 9 illustrates a second implementation of the reset circuits of the first capacitive coupled clock shifter in accordance with various embodiments of the present disclosure.

FIG. 9 illustrates a second implementation of the reset circuits of the first capacitive coupled clock shifter in accordance with various embodiments of the present disclosure. The first reset circuit 301 comprises a third p-type transistor P3, a fifth resistor R5, a first high voltage n-type transistor NH1, a first current mirror transistor NM1, a second current mirror transistor NM2 and a first current source I1. It should be noted that the reset circuits for the second capacitive coupled clock shifter can be implemented in a similar manner.

As shown in FIG. 9, the third p-type transistor P3 is connected in parallel with the first p-type transistor P1. The fifth resistor R5, the first high voltage n-type transistor HN1 and the first current mirror transistor NM1 are connected in series between the first voltage bus VIP and ground. The first current source I1 and a second current mirror transistor NM2 are connected in series between a bias voltage Vb and ground. The first current mirror transistor NM1 and the second current mirror transistor NM2 form a first current mirror.

The second reset circuit 302 comprises a fourth p-type transistor P4, a sixth resistor R6, a second high voltage n-type transistor HN2, a third current mirror transistor NM3, a fourth current mirror transistor NM4 and a second current source 12.

As shown in FIG. 9, the fourth p-type transistor P4 is connected in parallel with the second p-type transistor P2. The sixth resistor R6, the second high voltage n-type transistor HN2 and the third current mirror transistor NM3 are connected in series between the first voltage bus VIP and ground. The second current source 12 and the fourth current mirror transistor NM4 are connected in series between the bias voltage Vb and ground. The third current mirror transistor NM3 and the fourth current mirror transistor NM4 form a second current mirror.

In operation, a reset (RST) pulse is fed into the gate of HN1. A current flows through the turned-on HN1. This current creates a voltage drop across R5. The voltage drop across R5 turns on P3 to reset the output of the first capacitive coupled clock shifter to VIP. Likewise, the reset (RST) pulse is fed into the gate of HN2. A current flows through the turned-on HN2. This current creates a voltage drop across R6. The voltage drop across R6 turns on P4 to reset the output (CK1B_SHFT) of the first capacitive coupled clock shifter to VIP.

Figure 10:
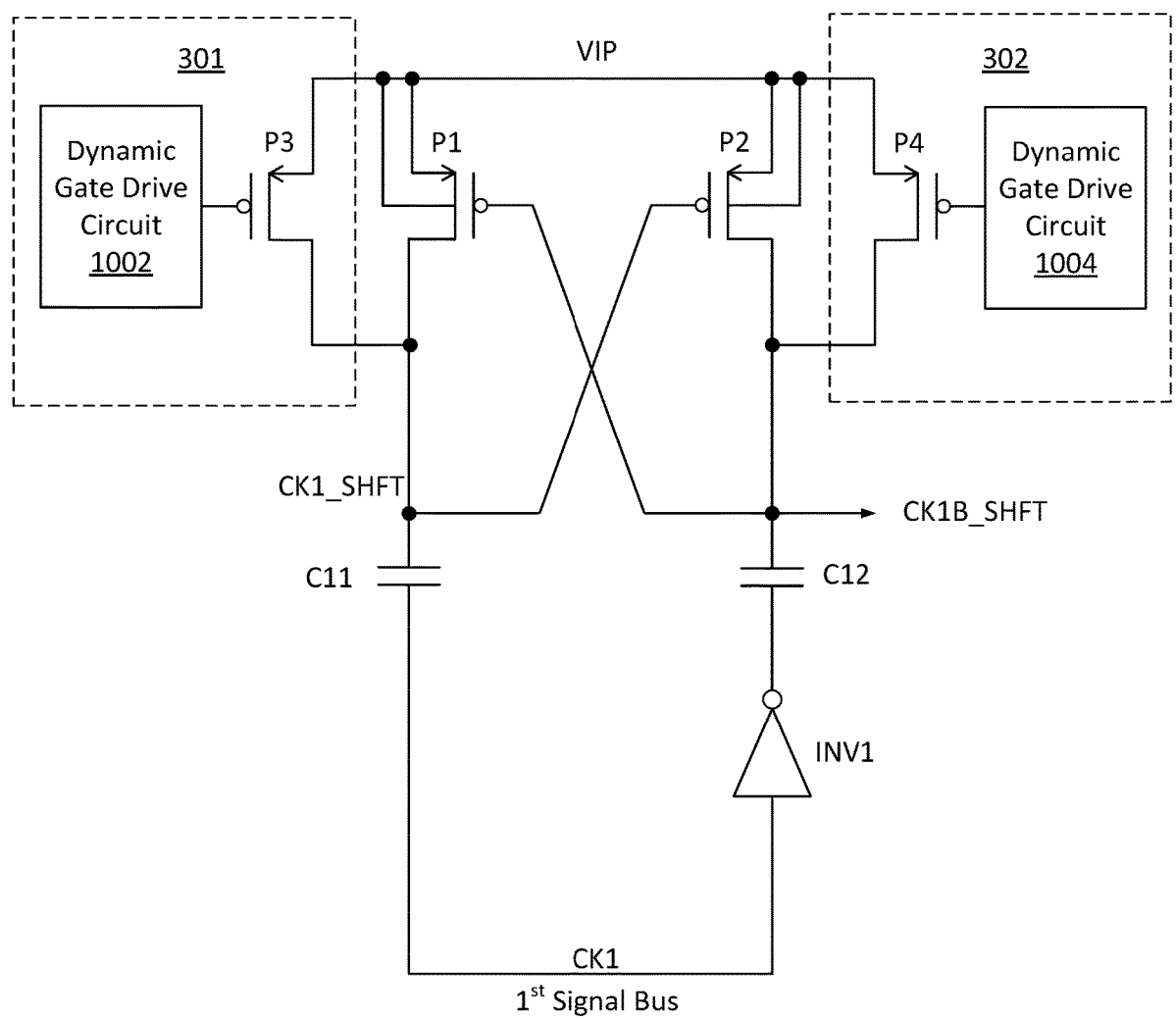
FIG. 10 illustrates a third implementation of the reset circuits of the first capacitive coupled clock shifter in accordance with various embodiments of the present disclosure.

FIG. 10 illustrates a third implementation of the reset circuits of the first capacitive coupled clock shifter in accordance with various embodiments of the present disclosure. The first reset circuit 301 comprises a third p-type transistor and a first dynamic gate drive circuit 1002. As shown in FIG. 10, the third p-type transistor P3 is connected in parallel with the first p-type transistor P1. The first dynamic gate drive circuit 1002 is configured to generate a first adjustable gate drive signal fed into a gate of the third p-type transistor P3. In some embodiments, the first dynamic gate drive circuit 1002 is controlled such that a resistance of the third p-type transistor P3 is equal to a first predetermined resistance. Through P3, the output (e.g., CK1_SHFT) is charged up to VIP once the first clock signal CK1 stops switching.

The second reset circuit 302 comprises a fourth p-type transistor P4 and a second dynamic gate drive circuit 1004. As shown in FIG. 10, the fourth p-type transistor P4 is connected in parallel with the second p-type transistor P2. The second dynamic gate drive circuit 1004 is configured to generate a second adjustable gate drive signal fed into a gate of the fourth p-type transistor P4. The second dynamic gate drive circuit 1004 is controlled such that a resistance of the fourth p-type transistor P4 is equal to a second predetermined resistance. Through P4, the output (e.g., CK1B_SHFT) is charged up to VIP once the first clock signal CK1 stops switching. It should be noted that the reset circuits for the second capacitive coupled clock shifter can be implemented in a similar manner as shown in FIG. 10.

Figure 11:
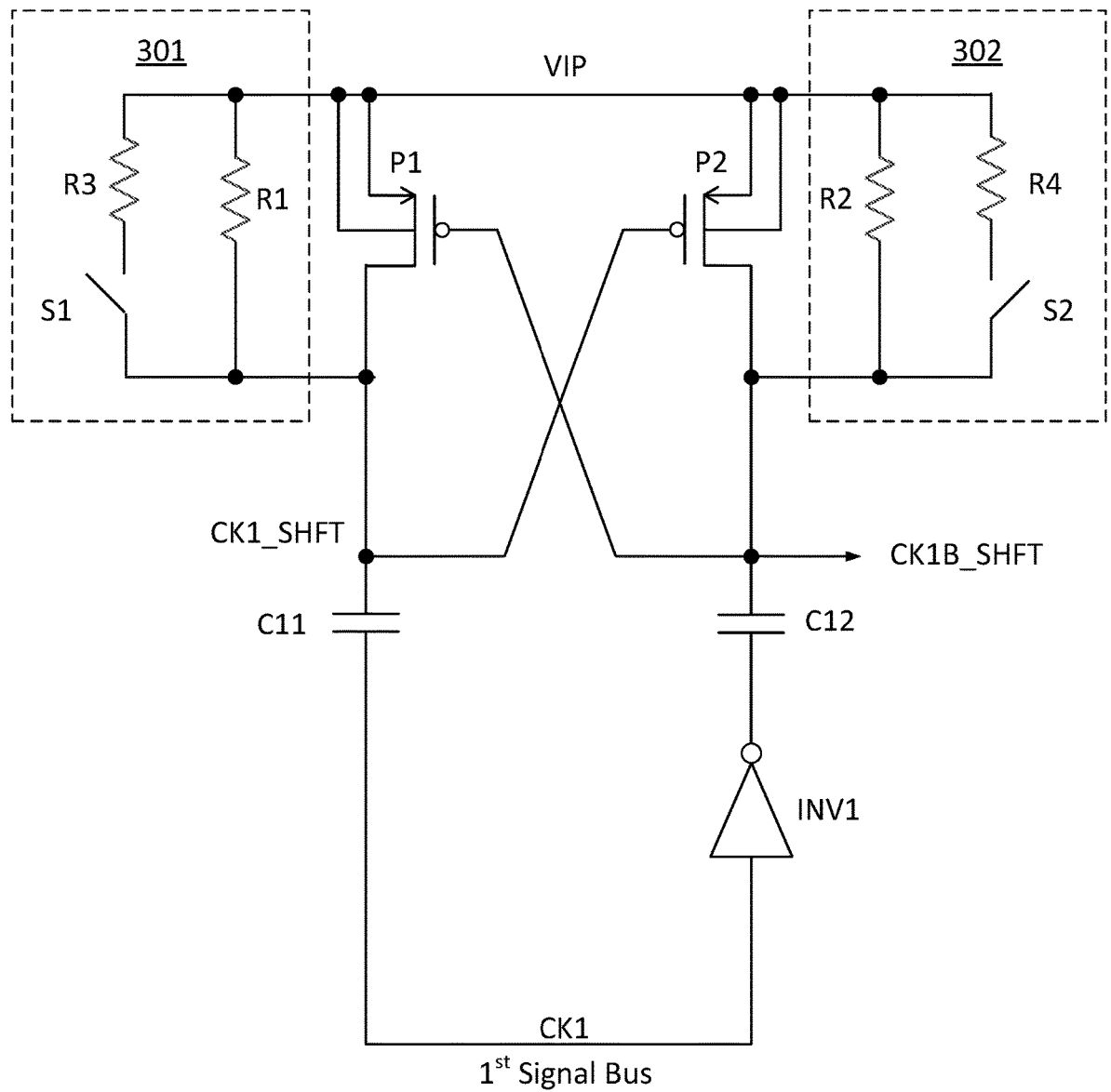
FIG. 11 illustrates a fourth implementation of the reset circuits of the first capacitive coupled clock shifter in accordance with various embodiments of the present disclosure.

FIG. 11 illustrates a fourth implementation of the reset circuits of the first capacitive coupled clock shifter in accordance with various embodiments of the present disclosure. The first reset circuit 301 comprises a first resistor R1, a third resistor R3 and a first switch S1. As shown in FIG. 11, the first resistor R1 is connected in parallel with the first p-type transistor P1. The third resistor R3 and the first switch S1 are connected in series and further in parallel with the first resistor R1.

The second reset circuit 302 comprises a second resistor R2, a fourth resistor R4 and a second switch S2. As shown in FIG. 11, the second resistor R2 is connected in parallel with the second p-type transistor P2. The fourth resistor R4 and the second switch S2 are connected in series and further in parallel with the second resistor R2.

In operation, the first switch S1 and the second switch S2 are turned on when the first reset circuit and the second reset circuit are configured to reset an output of the first capacitive coupled clock shifter so that an output voltage of the first capacitive coupled clock shifter is equal to a voltage (VIP) on the first voltage bus. In some embodiments, the resistance of R3 is much smaller than the resistance of R1. Once CK1 stops switching and R3 is connected in parallel with R1, R3 is able to provide a fast reset response. On the other hand, once CK1 is switching and R3 is not in parallel with R1, the large resistance value of R1 helps maintain the amplitude of the output clock. It should be noted that the reset circuits for the second capacitive coupled clock shifter can be implemented in a similar manner as shown in FIG. 11.

Figure 12:
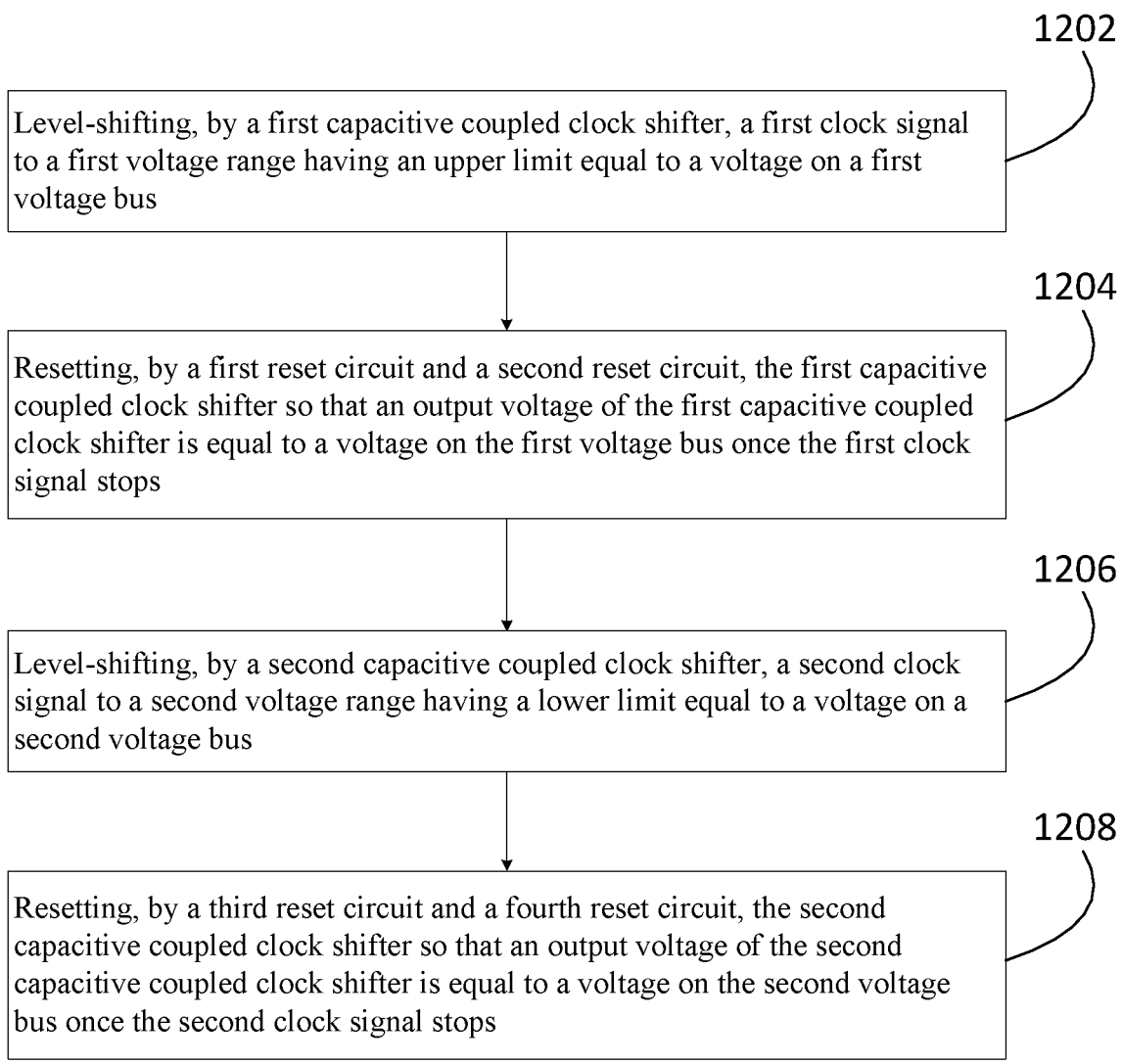
FIG. 12 illustrates a flow chart showing a method of generating gate drive signals for the voltage sampling system shown in FIG. 1 in accordance with various embodiments of the present disclosure.

FIG. 12 illustrates a flow chart showing a method of generating gate drive signals for the voltage sampling system shown in FIG. 1 in accordance with various embodiments of the present disclosure. This flowchart shown in FIG. 12 is merely an example, which should not unduly limit the scope of the claims. One of ordinary skill in the art would recognize many variations, alternatives, and modifications. For example, various steps illustrated in FIG. 12 may be added, removed, replaced, rearranged and repeated.

Referring back to FIG. 1, a plurality of batteries connected in series between VB and ground. A sampling circuit has two inputs coupled to a positive terminal and a negative terminal of a battery (e.g., B5) of the plurality of batteries. Referring back to FIG. 2, the sampling circuit comprises a first sampling switch coupled between a first voltage bus and a sampling capacitor. A first clock generator is configured to produce a first gate drive signal fed into a gate of the first sampling switch. Referring back to FIG. 3, the first clock generator comprises a first capacitive coupled clock shifter configured to level-shift a first clock signal to obtain the first gate drive signal, a first reset circuit and a second reset circuit. The sampling circuit further comprises a second sampling switch coupled between a second voltage bus and the sampling capacitor. A second clock generator is configured to produce a second gate drive signal fed into a gate of the second sampling switch. Referring back to FIG. 4, the second clock generator comprises a second capacitive coupled clock shifter configured to level-shift a second clock signal to obtain the first gate drive signal, a third reset circuit and a fourth reset circuit.

At step 1202, by a first capacitive coupled clock shifter, a first clock signal is level-shifted to a first voltage range having an upper limit equal to a voltage on a first voltage bus.

At step 1204, by a first reset circuit and a second reset circuit, the first capacitive coupled clock shifter is reset so that an output voltage of the first capacitive coupled clock shifter is equal to a voltage on the first voltage bus once the first clock signal stops.

At step 1206, by a second capacitive coupled clock shifter, a second clock signal is level-shifted to a second voltage range having a lower limit equal to a voltage on a second voltage bus.

At step 1208, by a third reset circuit and a fourth reset circuit, the second capacitive coupled clock shifter is reset so that an output voltage of the second capacitive coupled clock shifter is equal to a voltage on the second voltage bus once the second clock signal stops.

Referring back to FIG. 3, the first capacitive coupled clock shifter comprises a first p-type transistor and a first capacitor connected in series between the first voltage bus and a first signal bus, and a second p-type transistor, a second capacitor and a first inverter connected in series between the first voltage bus and the first signal bus, and wherein a common node of the first p-type transistor and the first capacitor is connected to a gate of the second p-type transistor, and a common node of the second p-type transistor and the second capacitor is connected to a gate of the first p-type transistor.

Referring back to FIG. 4, the second capacitive coupled clock shifter comprises a first n-type transistor, a third capacitor and a second inverter connected in series between the second voltage bus and a second signal bus, and a second n-type transistor and a fourth capacitor connected in series between the second voltage bus and the second signal bus, and wherein a common node of the first n-type transistor and the third capacitor is connected to a gate of the second n-type transistor, and a common node of the second n-type transistor and the fourth capacitor is connected to a gate of the first n-type transistor.

The method further comprises configuring a first reset circuit and a second reset circuit to reset an output of the first capacitive coupled clock shifter so that an output voltage of the first capacitive coupled clock shifter is equal to a voltage on the first voltage bus, wherein the first reset circuit comprises a first resistor connected in parallel with the first p-type transistor, and the second reset circuit comprises a second resistor connected in parallel with the second p-type transistor, and configuring a third reset circuit and a fourth reset circuit to reset an output of the second capacitive coupled clock shifter so that an output voltage of the second capacitive coupled clock shifter is equal to a voltage on the second voltage bus, wherein the third reset circuit comprises a third resistor connected in parallel with the first n-type transistor, and the fourth reset circuit comprises a fourth resistor connected in parallel with the second n-type transistor.

The method further comprises configuring a first reset circuit and a second reset circuit to reset an output of the first capacitive coupled clock shifter so that an output voltage of the first capacitive coupled clock shifter is equal to a voltage on the first voltage bus. It should be noted that the third reset circuit and the fourth reset circuit can be configured in a similar manner.

Referring back to FIG. 9, the first reset circuit comprises a third p-type transistor connected in parallel with the first p-type transistor, a fifth resistor, a first high voltage n-type transistor and a first current mirror transistor connected in series between the first voltage bus and ground, and a first current source and a second current mirror transistor connected in series between a bias voltage and ground, and wherein the first current mirror transistor and the second current mirror transistor form a first current mirror.

Referring back to FIG. 9, the second reset circuit comprises a fourth p-type transistor connected in parallel with the second p-type transistor, a sixth resistor, a second high voltage n-type transistor and a third current mirror transistor connected in series between the first voltage bus and ground, and a second current source and a fourth current mirror transistor connected in series between the bias voltage and ground, and wherein the third current mirror transistor and the fourth current mirror transistor form a second current mirror.

The method further comprises dynamically adjusting a first gate drive signal fed into a gate of a third p-type transistor connected in parallel with the first p-type transistor, wherein as a result of dynamically adjusting the first gate drive signal, a resistance of the third p-type transistor is equal to a first predetermined resistance, and dynamically adjusting a second gate drive signal fed into a gate of a fourth p-type transistor connected in parallel with the second p-type transistor, wherein as a result of dynamically adjusting the second gate drive signal, a resistance of the fourth p-type transistor is equal to a second predetermined resistance. It should be noted that the third reset circuit and the fourth reset circuit can be configured in a similar manner.

The method further comprises configuring a first reset circuit and a second reset circuit to reset an output of the first capacitive coupled clock shifter so that an output voltage of the first capacitive coupled clock shifter is equal to a voltage on the first voltage bus. It should be noted that the third reset circuit and the fourth reset circuit can be configured in a similar manner.

Referring back to FIG. 11, the first reset circuit comprises a first resistor connected in parallel with the first p-type transistor, and a third resistor and a first switch connected in series and further in parallel with the first resistor. The second reset circuit comprises a second resistor connected in parallel with the second p-type transistor, and a fourth resistor and a second switch connected in series and further in parallel with the second resistor. The first switch and the second switch are turned on when the first reset circuit and the second reset circuit are configured to reset the output of the first capacitive coupled clock shifter.

The method further comprises level-shifting the first clock signal to obtain a first gate drive signal fed into a first sampling switch coupled between a first voltage bus and a sampling capacitor, and level-shifting the second clock signal to obtain a second gate drive signal fed into a second sampling switch coupled between a second voltage bus and the sampling capacitor. A voltage of the first voltage bus is higher than a voltage of the second voltage bus. The first sampling switch is a p-type transistor having a source terminal coupled to the first voltage bus, a body terminal connected to the source terminal and a drain terminal coupled to the sampling capacitor. The second sampling switch is an n-type transistor having a source terminal coupled to the second voltage bus, a body terminal connected to the source terminal and a drain terminal coupled to the sampling capacitor.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus comprising:
a first sampling switch coupled between a first voltage bus and a sampling capacitor;
a first clock generator configured to produce a first gate drive signal fed into a gate of the first sampling switch, the first clock generator comprising a first capacitive coupled clock shifter, a first reset circuit and a second reset circuit, wherein the first reset circuit is connected to a first internal node of the first capacitive coupled clock shifter, and the second reset circuit is connected to a second internal node of the first capacitive coupled clock shifter;
a second sampling switch coupled between a second voltage bus and the sampling capacitor; and
a second clock generator configured to produce a second gate drive signal fed into a gate of the second sampling switch, the second clock generator comprising a second capacitive coupled clock shifter, a third reset circuit and a fourth reset circuit, wherein the third reset circuit is connected to a first internal node of the second capacitive coupled clock shifter, and the fourth reset circuit is connected to a second internal node of the second capacitive coupled clock shifter.

2. The apparatus of claim 1, wherein:
the first voltage bus is connected to a positive terminal of a battery of a plurality of batteries connected in series; and
the second voltage bus is connected to a negative terminal of the battery of the plurality of batteries connected in series.

3. The apparatus of claim 1, wherein:
the first sampling switch is a p-type transistor having a source terminal coupled to the first voltage bus, a body terminal connected to the source terminal and a drain terminal coupled to the sampling capacitor; and
the second sampling switch is an n-type transistor having a source terminal coupled to the second voltage bus, a body terminal connected to the source terminal and a drain terminal coupled to the sampling capacitor.

4. The apparatus of claim 1, wherein:
the first capacitive coupled clock shifter comprises:
a first p-type transistor and a first capacitor connected in series between the first voltage bus and a first signal bus; and
a second p-type transistor, a second capacitor and a first inverter connected in series between the first voltage bus and the first signal bus, and wherein a common node of the first p-type transistor and the first capacitor is the first internal node of the first capacitive coupled clock shifter connected to a gate of the second p-type transistor, and a common node of the second p-type transistor and the second capacitor is the second internal node of the first capacitive coupled clock shifter connected to a gate of the first p-type transistor; and
the second capacitive coupled clock shifter comprises:
a first n-type transistor, a third capacitor and a second inverter connected in series between the second voltage bus and a second signal bus; and
a second n-type transistor and a fourth capacitor connected in series between the second voltage bus and the second signal bus, and wherein a common node of the first n-type transistor and the third capacitor is the first internal node of the second capacitive coupled clock shifter connected to a gate of the second n-type transistor, and a common node of the second n-type transistor and the fourth capacitor is the second internal node of the second capacitive coupled clock shifter connected to a gate of the first n-type transistor.

5. The apparatus of claim 4, further comprising:
a first resistor connected between the first voltage bus, and the common node of the first p-type transistor and the first capacitor; and
a second resistor connected between the first voltage bus, and the common node of the second p-type transistor and the second capacitor, wherein the first resistor and the second resistor function as the first reset circuit and the second reset circuit, respectively, and wherein the first reset circuit and the second reset circuit are configured to reset an output of the first capacitive coupled clock shifter so that an output voltage of the first capacitive coupled clock shifter is equal to a voltage on the first voltage bus.

6. The apparatus of claim 4, further comprising:
a third resistor connected between the second voltage bus, and the common node of the first n-type transistor and the third capacitor; and
a fourth resistor connected between the second voltage bus, and the common node of the second n-type transistor and the fourth capacitor, wherein the third resistor and the fourth resistor function as the third reset circuit and the fourth reset circuit, respectively, and wherein the third reset circuit and the fourth reset circuit are configured to reset an output of the second capacitive coupled clock shifter so that an output voltage of the second capacitive coupled clock shifter is equal to a voltage on the second voltage bus.

7. The apparatus of claim 4, wherein:
the first reset circuit comprises:
 a third p-type transistor connected in parallel with the first p-type transistor;
 a fifth resistor, a first high voltage n-type transistor and a first current mirror transistor connected in series between the first voltage bus and ground, and wherein a common node of the fifth resistor and the first high voltage n-type transistor is connected to a gate of the third p-type transistor; and
a first current source and a second current mirror transistor connected in series between a bias voltage and ground, and wherein the first current mirror transistor and the second current mirror transistor form a first current mirror; and
the second reset circuit comprises:
 a fourth p-type transistor connected in parallel with the second p-type transistor;
 a sixth resistor, a second high voltage n-type transistor and a third current mirror transistor connected in series between the first voltage bus and ground, and wherein a common node of the sixth resistor and the second high voltage n-type transistor is connected to a gate of the fourth p-type transistor; and
 a second current source and a fourth current mirror transistor connected in series between the bias voltage and ground, and wherein the third current mirror transistor and the fourth current mirror transistor form a second current mirror.

8. The apparatus of claim 4, wherein:
the first reset circuit comprises:
 a third p-type transistor connected in parallel with the first p-type transistor; and
 a first dynamic gate drive circuit configured to generate a first adjustable gate drive signal fed into a gate of the third p-type transistor, and wherein the first dynamic gate drive circuit is controlled such that a resistance of the third p-type transistor is equal to a first predetermined resistance; and
the second reset circuit comprises:
 a fourth p-type transistor connected in parallel with the second p-type transistor; and
 a second dynamic gate drive circuit configured to generate a second adjustable gate drive signal fed into a gate of the fourth p-type transistor, and wherein the second dynamic gate drive circuit is controlled such that a resistance of the fourth p-type transistor is equal to a second predetermined resistance.

9. The apparatus of claim 4, wherein:
the first reset circuit comprises:
 a first resistor connected in parallel with the first p-type transistor; and
 a third resistor and a first switch connected in series and further in parallel with the first resistor; and
the second reset circuit comprises:
 a second resistor connected in parallel with the second p-type transistor; and
 a fourth resistor and a second switch connected in series and further in parallel with the second resistor, and wherein the first switch and the second switch are turned on when the first reset circuit and the second reset circuit are configured to reset an output of the first capacitive coupled clock shifter so that an output voltage of the first capacitive coupled clock shifter is equal to a voltage on the first voltage bus.

10. A method comprising:
level-shifting, by a first capacitive coupled clock shifter, a first clock signal to a first voltage range having an upper limit equal to a voltage on a first voltage bus;
resetting, by a first reset circuit and a second reset circuit, the first capacitive coupled clock shifter so that an output voltage of the first capacitive coupled clock shifter is equal to a voltage on the first voltage bus once the first clock signal stops;
level-shifting, by a second capacitive coupled clock shifter, a second clock signal to a second voltage range having a lower limit equal to a voltage on a second voltage bus; and
resetting, by a third reset circuit and a fourth reset circuit, the second capacitive coupled clock shifter so that an output voltage of the second capacitive coupled clock shifter is equal to a voltage on the second voltage bus once the second clock signal stops.

11. The method of claim 10, wherein:
the first capacitive coupled clock shifter comprises:
 a first p-type transistor and a first capacitor connected in series between the first voltage bus and a first signal bus; and
 a second p-type transistor, a second capacitor and a first inverter connected in series between the first voltage bus and the first signal bus, and wherein a common node of the first p-type transistor and the first capacitor is connected to a gate of the second p-type transistor, and a common node of the second p-type transistor and the second capacitor is connected to a gate of the first p-type transistor; and
the second capacitive coupled clock shifter comprises:
 a first n-type transistor, a third capacitor and a second inverter connected in series between the second voltage bus and a second signal bus; and
 a second n-type transistor and a fourth capacitor connected in series between the second voltage bus and the second signal bus, and wherein a common node of the first n-type transistor and the third capacitor is connected to a gate of the second n-type transistor, and a common node of the second n-type transistor and the fourth capacitor is connected to a gate of the first n-type transistor.

12. The method of claim 11, further comprising:
configuring a first reset circuit and a second reset circuit to reset an output of the first capacitive coupled clock shifter so that an output voltage of the first capacitive coupled clock shifter is equal to a voltage on the first voltage bus, wherein the first reset circuit comprises a first resistor connected in parallel with the first p-type transistor, and the second reset circuit comprises a second resistor connected in parallel with the second p-type transistor; and configuring a third reset circuit and a fourth reset circuit to reset an output of the second capacitive coupled clock shifter so that an output voltage of the second capacitive coupled clock shifter is equal to a voltage on the second voltage bus, wherein the third reset circuit comprises a third resistor connected in parallel with the first n-type transistor, and the fourth reset circuit comprises a fourth resistor connected in parallel with the second n-type transistor.

13. The method of claim 11, further comprising:

configuring a first reset circuit and a second reset circuit to reset an output of the first capacitive coupled clock shifter so that an output voltage of the first capacitive coupled clock shifter is equal to a voltage on the first voltage bus, wherein:

the first reset circuit comprises:
   a third p-type transistor connected in parallel with the first p-type transistor;
   a fifth resistor, a first high voltage n-type transistor and a first current mirror transistor connected in series between the first voltage bus and ground; and
   a first current source and a second current mirror transistor connected in series between a bias voltage and ground, and wherein the first current mirror transistor and the second current mirror transistor form a first current mirror; and the second reset circuit comprises:
   a fourth p-type transistor connected in parallel with the second p-type transistor;
   a sixth resistor, a second high voltage n-type transistor and a third current mirror transistor connected in series between the first voltage bus and ground; and
   a second current source and a fourth current mirror transistor connected in series between the bias voltage and ground, and wherein the third current mirror transistor and the fourth current mirror transistor form a second current mirror.

14. The method of claim 11, further comprising:

dynamically adjusting a first gate drive signal fed into a gate of a third p-type transistor connected in parallel with the first p-type transistor, wherein as a result of dynamically adjusting the first gate drive signal, a resistance of the third p-type transistor is equal to a first predetermined resistance; and dynamically adjusting a second gate drive signal fed into a gate of a fourth p-type transistor connected in parallel with the second p-type transistor, wherein as a result of dynamically adjusting the second gate drive signal, a resistance of the fourth p-type transistor is equal to a second predetermined resistance.

15. The method of claim 11, further comprising:

configuring a first reset circuit and a second reset circuit to reset an output of the first capacitive coupled clock shifter so that an output voltage of the first capacitive coupled clock shifter is equal to a voltage on the first voltage bus, wherein:

the first reset circuit comprises:
   a first resistor connected in parallel with the first p-type transistor; and
   a third resistor and a first switch connected in series and further in parallel with the first resistor; and the second reset circuit comprises:
   a second resistor connected in parallel with the second p-type transistor; and
   a fourth resistor and a second switch connected in series and further in parallel with the second resistor, and wherein the first switch and the second switch are turned on when the first reset circuit and the second reset circuit are configured to reset the output of the first capacitive coupled clock shifter.

16. The method of claim 11, further comprising:

level-shifting the first clock signal to obtain a first gate drive signal fed into a first sampling switch coupled between the first voltage bus and a sampling capacitor; and level-shifting the second clock signal to obtain a second gate drive signal fed into a second sampling switch coupled between a second voltage bus and the sampling capacitor.

17. The method of claim 16, wherein:

a voltage of the first voltage bus is higher than a voltage of the second voltage bus;

the first sampling switch is a p-type transistor having a source terminal coupled to the first voltage bus, a body terminal connected to the source terminal and a drain terminal coupled to the sampling capacitor; and the second sampling switch is an n-type transistor having a source terminal coupled to the second voltage bus, a body terminal connected to the source terminal and a drain terminal coupled to the sampling capacitor.

18. A system comprising:

a plurality of batteries connected in series;

a sampling circuit having two inputs coupled to a positive terminal and a negative terminal of a battery of the plurality of batteries, respectively, wherein the sampling circuit comprises:
   a first sampling switch coupled between a first voltage bus and a sampling capacitor;
   a first clock generator configured to produce a first gate drive signal fed into a gate of the first sampling switch, the first clock generator comprising a first capacitive coupled clock shifter configured to level-shift a first clock signal to obtain the first gate drive signal, a first reset circuit and a second reset circuit, and wherein the first reset circuit is connected to a first internal node of the first capacitive coupled clock shifter, and the second reset circuit is connected to a second internal node of the first capacitive coupled clock shifter;
   a second sampling switch coupled between a second voltage bus and the sampling capacitor; and
   a second clock generator configured to produce a second gate drive signal fed into a gate of the second sampling switch, the second clock generator comprising a second capacitive coupled clock shifter configured to level-shift a second clock signal to obtain the first gate drive signal, a third reset circuit and a fourth reset circuit, and wherein the third reset circuit is connected to a first internal node of the second capacitive coupled clock shifter, and the fourth reset circuit is connected to a second internal node of the second capacitive coupled clock shifter;

a common mode reference coupled to an output of the sampling circuit through a first control switch; and a charge process circuit coupled to the output of the sampling circuit through a second control switch.

19. The system of claim 18, wherein:
the first capacitive coupled clock shifter comprises:
- a first p-type transistor and a first capacitor connected in series between the first voltage bus and a first signal bus, and wherein the first clock signal flows on the first signal bus; and
- a second p-type transistor, a second capacitor and a first inverter connected in series between the first voltage bus and the first signal bus, and wherein a common node of the first p-type transistor and the first capacitor is the first internal node of the first capacitive coupled clock shifter connected to a gate of the second p-type transistor, and a common node of the second p-type transistor and the second capacitor is the second internal node of the first capacitive coupled clock shifter connected to a gate of the first p-type transistor;

the first reset circuit comprises a first resistor connected in parallel with the first p-type transistor;
the second reset circuit comprises a second resistor connected in parallel with the second p-type transistor; and
the second capacitive coupled clock shifter comprises:
- a first n-type transistor, a third capacitor and a second inverter connected in series between the second voltage bus and a second signal bus, wherein the second clock signal flows on the second signal bus; and
- a second n-type transistor and a fourth capacitor connected in series between the second voltage bus and the second signal bus, and wherein a common node of the first n-type transistor and the third capacitor is the first internal node of the second capacitive coupled clock shifter connected to a gate of the second n-type transistor, and a common node of the second n-type transistor and the fourth capacitor is the second internal node of the second capacitive coupled clock shifter connected to a gate of the first n-type transistor;

the third reset circuit comprises a third resistor connected in parallel with the first n-type transistor; and
the fourth reset circuit comprises a fourth resistor connected in parallel with the second n-type transistor.

20. The system of claim 19, wherein:
the first clock signal is fed into a gate of the first control switch;
the second clock signal is fed into a gate of the second control switch; and
the charge process circuit comprises an amplifier, a capacitor and a switch, and wherein:
- the capacitor is connected between a first input and an output of the amplifier;
- the switch is coupled between the first input and the output of the amplifier; and
- a second input of the amplifier is configured to receive the common mode reference.

* * * * *